US006622886B2

United States Patent
Kaupp et al.

(10) Patent No.: US 6,622,886 B2
(45) Date of Patent: Sep. 23, 2003

(54) BEVERAGE HOLDER

(75) Inventors: Klaus Kaupp, Waldachtal (DE);
Torsten Bieck, Waldachtal (DE);
Thomas Greim, Waldachtal (DE); Inge Schierling, Lossburg (DE)

(73) Assignee: fischerwerke Artur Fischer GmbH & CO. KG, Waldachtal (DE)

( * ) Notice: Subject to any disclaimer, the term of this patent is extended or adjusted under 35 U.S.C. 154(b) by 45 days.

(21) Appl. No.: 10/059,544

(22) Filed: Jan. 29, 2002

(65) Prior Publication Data

US 2002/0100761 A1 Aug. 1, 2002

(30) Foreign Application Priority Data

Jan. 30, 2001 (DE) .................................... 201 01 540 U

(51) Int. Cl.$^7$ .............................................. B65D 25/00
(52) U.S. Cl. ........................................ 220/737; 224/926
(58) Field of Search .......................... 224/926; 220/737, 220/738, 739; 248/311.2

(56) References Cited

U.S. PATENT DOCUMENTS 4,693,440 A * 9/1987 Lalonde ...................... 248/154
4,981,277 A * 1/1991 Elwell ....................... 248/311.2
5,207,076 A * 5/1993 Sciarrillo .................... 62/457.4
5,671,877 A   9/1997 Yabuya
5,820,094 A * 10/1998 Tanaka ...................... 248/311.2
5,833,194 A * 11/1998 Jones et al. ............... 248/311.2
5,839,602 A * 11/1998 Mowry ........................ 220/737
5,881,935 A * 3/1999 Ono et al. ................... 224/282

FOREIGN PATENT DOCUMENTS

FR           2 758 299           7/1998

* cited by examiner

Primary Examiner—Joseph M. Moy
(74) Attorney, Agent, or Firm—Michael J. Striker

(57) ABSTRACT

A beverage holder has a base part provided with an insertion opening for insertion of a beverage container, a displaceable holding element which is arranged in an edge region of the insertion opening and has a turning bearing so that upon turning of the holding element the insertion opening is adaptable to different diameters of beverage containers, an arresting device which holds the holding element in a corresponding turning position, the holding element having a displacement guide which extends transversely to the arresting device, so that by displacing the holding element in the displacement guide the arresting device is disengaged and the holding element is turnable, and a spring element which loads the holding element in a direction of the displacement guide and presses the holding element in engagement with the arresting device.

10 Claims, 1 Drawing Sheet

BEVERAGE HOLDER

BACKGROUND OF THE INVENTION

The present invention relates beverage holders, and in particular for use in motor vehicles.

Such beverage holders are known in numerous embodiments. They are mountable in a motor vehicle or another moving means and serve for tilt-free holding of an inserted beverage container. The beverage containers can be for example a can, a cup, a mug and the like. The known beverage holders have an insertion opening for insertion of the beverage container. For adaptation to beverage containers with different diameters, the beverage holders are provided with an adjustable holding element which forms a part of an insertion opening and is arranged in its edge region. The holding element has a turning support, with which it is turnable for adaptation to different diameters of the beverage containers in the insertion opening. By turning of the holding element a throughgoing width of the insertion opening is adjustable. For arresting the holding element in its corresponding turning position it is known to provide an arresting device. The arresting device is formed so that by applying a sufficiently high force on the holding element it disengages and thereby allows turning of the holding element. The known arresting devices have however the disadvantage that they require high force for disengagement of the arresting device and turning of the holding element.

SUMMARY OF THE INVENTION

Accordingly, it is an object of the present invention to provide a beverage holder of the above mentioned general type which avoids the disadvantages of the prior art.

More particularly it is an object of the present invention to provide a beverage holder of the above mentioned general type in which a holding element can be turned without application of great forces.

In keeping with these objects and with others which will become apparent hereinafter, one feature of present invention resides, briefly stated, in a beverage holder, comprising a base part provided with an insertion opening for insertion of a beverage container; a displaceable holding element which is arranged in an edge region of said insertion opening and has a turning bearing so that upon turning of said holding element said insertion opening is adaptable to different diameters of beverage containers; an arresting device which holds said holding element in a corresponding turning position, said holding element having a displacement guide which extends transversely to said arresting device, so that by displacing said holding element in said displacement guide said arresting device is disengaged and said holding element is turnable; and a spring element which loads said holding element in a direction of said displacement guide and presses said holding element in engagement with said arresting device.

In accordance with the invention the turnable holding element of the inventive beverage holder has a displacement guide which extends transversely to the arresting device. The arresting device is brought out of engagement by displacement of the holding element in the displacement direction and the holding element is turnable. Thereby the displacement of the holding element in the displacement direction is performed and it provides disengagement of the arresting device, preferably by a force applied for turning the holding element to it.

Furthermore, the inventive beverage holder has a spring element which loads the holding element in a direction of the displacement guide and thereby presses the arresting device into the engaging position. For bringing the arresting device in a disengaged position, the holding element is thereby displaced against the force of the spring element in the displacement direction so far that the arresting device disengages.

The course of the displacement guide transversely to the arresting device is a course is understood which brings the arresting device out of engagement by displacement of the holding element in the displacement guide. The displacement guide must not be perpendicular or radial to a circular-arc-shaped arresting device. The displacement guide can extend also at an angle to the above mentioned direction. Also, the displacement guide is not necessarily a straight guide, but it can be also formed as an arcuate guide.

The holding device forms a part of an insertion opening. It completes the insertion opening in the peripheral direction so that an inserted beverage container is held tilt-free in all directions. The insertion opening must not be closed in the peripheral direction. It suffices when the insertion opening including the turnable holding element which supports the inserted beverage container at several points of its periphery so that the beverage container is held tilt-free in all directions.

The present invention has the advantage that the arresting device which holds the turnable or displaceable holding element in its corresponding turning position can be brought out of engagement without application of great forces, so that the holding element without application of great forces can be turned and thereby adapted to the diameter of a beverage container inserted in the beverage holder. A further advantage of the invention is that the force required for turning of the holding element is a relatively accurately fixable and also is maintained in mass production with in a low fluctuation range.

In accordance with one embodiment of the present invention, a pin inserted in an elongated hole is used as a turning bearing of the holding element. The pin is rotatable and displaceable in the elongated hole, so that the turning bearing simultaneously also forms a displacement guide of the holding element. This design allows a simple and price-favorable construction of the invention.

In accordance with another embodiment of the present invention the holding element can be formed as a holding bracket. In particular an inner side of the holding element which faces the insertion opening of the beverage holder can be concave.

A turning axis of the holding element can extend in any directions. In accordance with one embodiment of the invention, a vertical course of the turning axis is proposed. The vertical direction means the course of the turning axis of the beverage holder in its predetermined insertion position.

The arresting device and the holding element in one of the embodiments of the present invention can have a toothed rack which extends arcuate around the turning bearing. The toothed rack cooperates with at least one arresting projection. The arresting projections can form a second toothed rack. The toothed rack can be arranged immovably on the beverage holder and at least one arresting projection can be arranged on the holding element, or vice versa the toothed rack can be formed on the holding element and its cooperating arresting projection can be formed immovably.

Preferably the toothed rack and/or the at least one arresting projection can be formed springy. Therefore at least one arresting projection under the action of a force acting in a longitudinal direction of the toothed rack can be disengaged from the toothed rack by an incline of tooth flanks of the teeth of the toothed rack. This force which acts in the longitudinal direction of the toothed rack is actuated by a force applied to the holding element for turning.

For springy construction, the toothed rack and/or the arresting projection can be arranged on a spring tongue. This makes possible, during a production of the beverage container or its holding element to use a spring-elastic material, for example synthetic plastic so that the toothed rack or the arresting projection are formed of one piece with the beverage container or the holding element.

The novel features which are considered as characteristic for the present invention are set forth in particular in the appended claims. The invention itself, however, both as to its construction and its method of operation, together with additional objects and advantages thereof, will be best understood from the following description of specific embodiments when read in connection with the accompanying drawings.

BRIEF DESCRIPTION OF THE DRAWINGS

The single FIGURE of the drawings is a plan view of a beverage holder in accordance with the present invention.

DESCRIPTION OF THE PREFERRED EMBODIMENTS

Figure 1:
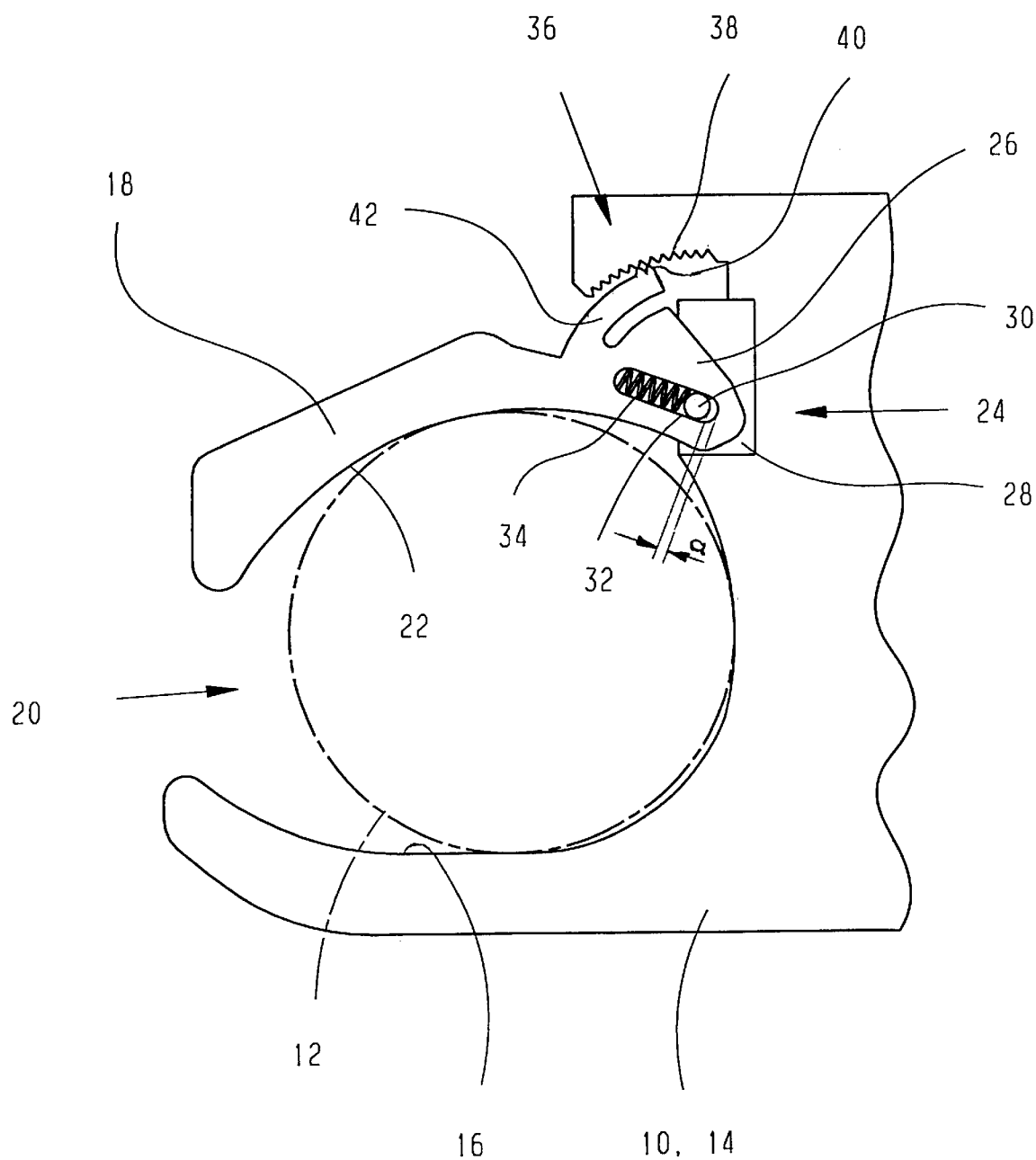

A beverage container in accordance with the present invention is identified in the drawing with reference numeral 10. It is used for insertion in a not shown motor vehicle or another moving means. It serves for a tilt-free holding of a beverage container 12, such as for example a can or the like, which in FIG. 1 is shown with a broken line.

The beverage holder 10 has a base part 14 provided with a circular-arc-shaped recess 16. In the shown embodiment it extends over approximately 100° in a peripheral direction. The beverage holder further has a holding element 18 which together with a recess 16 forms an insertion opening 20 for the beverage container 12. The holding element 18 is formed as an arc-shaped holding arm with a concave inner side 22 which faces the insertion opening 20. Together with the opening 16 of the base part 14, the holding element 18 surrounds the beverage container 12 inserted in the insertion opening 20 over a peripheral portion of approximately 270°, but in any event substantially over 180°. It holds the beverage container 12 inserted in the insertion opening 20 in a tilt-free manner in the beverage holder 10. The holding element 18 is arranged in an edge region of the insertion opening 20 which is formed by the recess 16 of the base part 14. The concave inner side 22 of the holding element 18 forms a part of the insertion opening 20 or an edge of the insertion opening 20.

The holding element 18 is turnable by means of a turning bearing 24 relative to the insertion opening 20 over a certain distance inwardly and outwardly. By turning of the holding element 18, a throughgoing width of the insertion opening 20 can be changed and adapted to a diameter of the corresponding inserted beverage container 12. For providing a turning bearing, an end of the holding element 18 facing the base part 14 is slotted, so that the holding element 18 at this end has two tongues 26 which are superposed over one another. A web 28 extends between the both tongues 26 of the holding element 18 and is formed of one piece with the base part 14 of the beverage holder 10.

Two coaxial pins 30 extend from the web 28 of the base part 18 upwardly and downwardly. The both pins 30 are located in elongated holes 32 formed in the tongues 26 of the holding element 18. The pins 30 inserted in the elongated holes 32 support the holding element 18 turnably on the base part 14. They form the turning bearing 24. Simultaneously the pins 30 guide the holding element 18 in the elongated holes 32 displaceably and they form also a displacement guide for the holding element 18. A spring element 34 acts on the pins 30 in direction of an end of the elongated hole 32 which faces the base part 14. The spring element 34 in the shown embodiment of the invention is formed as a helical pressure spring inserted in the elongated hole 32.

For holding of the holding element 18 in its corresponding turning position the inventive beverage holder 10 is provided with an arresting device 36. The arresting device 36 includes a toothed rack 38 which in the shown embodiment of the invention is formed of one piece with the base part 14 of the beverage holder 10 or in other words is immovable. The toothed rack 38 extends in a circular-arc-shaped course around the pins 30. The arresting device 36 further has two arresting projections or elements 40 which are formed as teeth and arranged on the holding element 18. The arresting elements 40 can be fixed on the holding element 18. In the shown embodiment the arresting elements 40 are located at a free end of a spring tongue 42 which projects from the holding element 18. They are therefore formed springy.

In an arrested position the arresting elements 40 are located between teeth of the tooth rack 38 and hold the holding element 18 in its corresponding turning position. For turning the holding element 18 a force is applied which is directed inwardly or outwardly with respect to the insertion opening 20 to the holding element 18. This force provides a force component in a longitudinal direction of the tooth rack 38 which, when the applied force is sufficiently great due to an incline of tooth flanks of the teeth of the toothed rack 38 and the arresting elements 40, disengages the arresting elements 40 from the tooth rack 38 and thereby makes possible the turning of the holding element 18. Such a disengaged position in which the arresting projections 40 are disengaged from the toothed rack 38 is shown in FIG. 1. The arresting elements 40 stand on tooth tips of the teeth of the toothed rack 38. The spring tongues due to their spring elasticity allow bringing the arresting elements 40 out of the engagement with the toothed rack 38.

When for turning of the holding element 18 in the above described manner a force is applied to the holding element 18 which is oriented inwardly and outwardly, it causes a force component in the longitudinal direction of the elongated hole 32 in the tongue 26, at the end of the holding element 18 which faces the base part 14. As shown in the drawings, this force component presses the pins 30 against the force of the spring element 34 over a path identified as "a" from the end of the elongated holes 32. Also this displacement of the holding element 18 on the pins 30 allows a disengagement of the arresting projections 40 from the toothed rack 38. By the displacement guidance of the holding element 18 with the elongated holes 32 and the pins 30 of the base part 14, the arresting of the arresting device 36 and thereby the turning of the holding element 18 for adaptation to the diameter of a beverage container in the beverage container 12 inserted in the container holder 10 is facilitated. By the displacement guidance of the holding element 18 on the base part 14 it is basically possible to provide the arresting projections 40 not springy, but instead to arrange them without the springy tongues 42 rigidly on the holding element 18.

It will be understood that each of the elements described above, or two or more together, may also find a useful application in other types of constructions differing from the types described above.

While the invention has been illustrated and described as embodied in beverage holder, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims:

What is claimed is:

1. A beverage holder, comprising a base part provided with an insertion opening for insertion of a beverage container; a displaceable holding element which is arranged in an edge region of said insertion opening and has a turning bearing so that upon turning of said holding element said insertion opening is adaptable to different diameters of beverage containers; an arresting device which holds said holding element in a corresponding turning position, said holding element having a displacement guide which extends transversely to said arresting device, so that by displacing said holding element in said displacement guide said arresting device is disengaged and said holding element is turnable; and a spring element which loads said holding element in a direction of said displacement guide and presses said holding element in engagement with said arresting device.

2. A beverage holder as defined in claim 1, wherein said turning bearing includes a pin and an elongated hole in which said pin is turnably and displaceably arranged, so that said turning bearing simultaneously forms said displacement guide.

3. A beverage holder as defined in claim 1, wherein said holding element is formed as a holding arm with an inner concave side facing said insertion opening.

4. A beverage holder as defined in claim 1, wherein said holding element is turnable about a vertical turning axis.

5. A beverage holder as defined in claim 1, wherein said arresting device has a toothed rack which cooperates with at least one arresting projection.

6. A beverage holder as defined in claim 5, wherein said toothed rack has an arcuate shape.

7. A beverage holder as defined in claim 5, wherein said toothed rack is springy.

8. A beverage holder as defined in claim 5, wherein said at least one arresting projection is springy.

9. A beverage holder as defined in claim 5, wherein said toothed rack is arranged on a spring tongue.

10. A beverage holder as defined in claim 1, wherein said at least one arresting projection is arranged on a spring tongue.

\* \* \* \* \*